United States Patent [19]

Jakobsen et al.

[11] Patent Number: 4,493,633
[45] Date of Patent: Jan. 15, 1985

[54] APPARATUS FOR MOULDING AN ARTICLE FROM PLASTIC MATERIAL

[75] Inventors: Kjell M. Jakobsen, Skanör; Claes T. Nilsson, Löddeköpinge; Lars G. Larsson, Höör, all of Sweden

[73] Assignee: PLM Aktiebolag, Malmo, Sweden

[21] Appl. No.: 457,887

[22] Filed: Jan. 14, 1983

Related U.S. Application Data

[62] Division of Ser. No. 196,374, Oct. 14, 1980, Pat. No. 4,409,176.

[30] Foreign Application Priority Data

Jan. 30, 1980 [SE] Sweden .............................. 8000722

[51] Int. Cl.³ ............................................. B29C 17/07
[52] U.S. Cl. ..................... 425/525; 425/526; 425/527; 425/530
[58] Field of Search ............... 425/522, 525, 526, 527, 425/530, 532; 264/506, 507, 527, 534

[56] References Cited

U.S. PATENT DOCUMENTS

| 3,050,773 | 8/1962 | Hagen | 264/534 |
|---|---|---|---|
| 3,371,381 | 3/1968 | Louth | 264/507 X |
| 3,651,186 | 3/1972 | Hall | 264/94 |
| 3,859,408 | 1/1975 | Voss et al. | 264/89 |
| 4,097,570 | 6/1978 | Dickson et al. | 264/296 |
| 4,228,122 | 10/1980 | Hammes | 264/534 |

FOREIGN PATENT DOCUMENTS

| 1801179 | 5/1974 | Fed. Rep. of Germany |   |
|---|---|---|---|
| 1950270 | 2/1976 | Fed. Rep. of Germany |   |
| 2504395 | 5/1976 | Fed. Rep. of Germany |   |
| 1227505 | 8/1960 | France | 425/532 |
| 652810 | 5/1951 | United Kingdom | 264/507 |
| 2037220 | 7/1980 | United Kingdom |   |

Primary Examiner—Jan H. Silbaugh
Attorney, Agent, or Firm—Roberts Spiecens & Cohen

[57] ABSTRACT

Apparatus for moulding an article (11) of thermoplastic material from a parison (10) in which certain parts (17,16) of the parison are re-formed while other parts (13,12,20) retain their shape. A difference in pressure is applied to the wall of the parison during the re-forming process. Material in the parison is also moved in the direction of those parts of the parison which are to be re-formed, whereby attenuation of the material may be avoided entirely, if so desired, also in those parts which are to be re-formed. The invention enables the parison for a bottle to be re-formed to an extent which is small by comparison with the thickness of the material, for example the so-called "neck support" ring and the so-called "pilfer proof" ring, starting with a tube of oriented material. In a device for the application of the invention the elements (22,21,25) are in contact with the parts (13,12,20) of the parison. Between the elements, which are movable relative to each other, are to be found depressions (27,26) in which the parts (17,16) are re-formed. When the elements (22,21,25) are moved towards each other, the size of the depressions is reduced in the direction of the movement.

15 Claims, 13 Drawing Figures

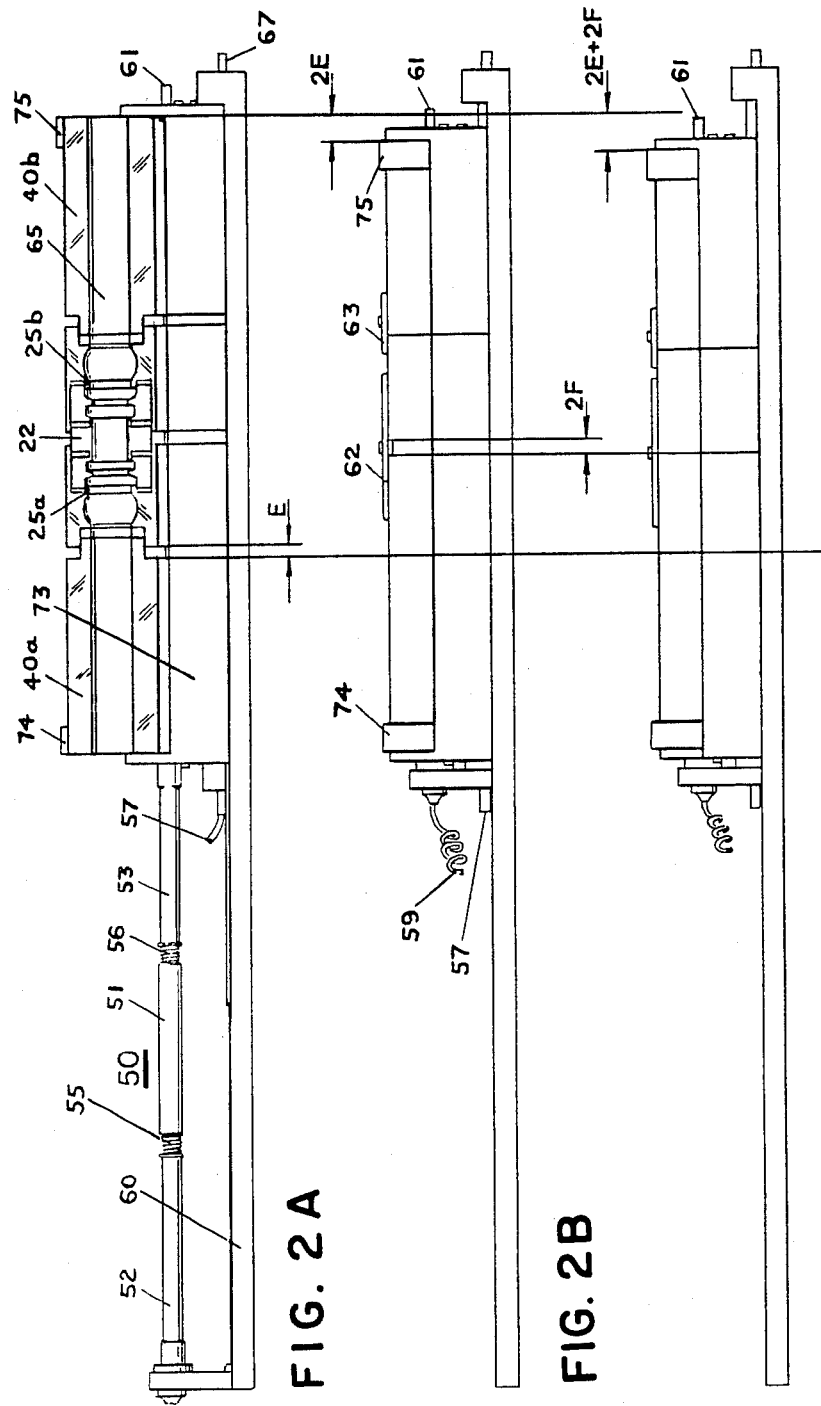

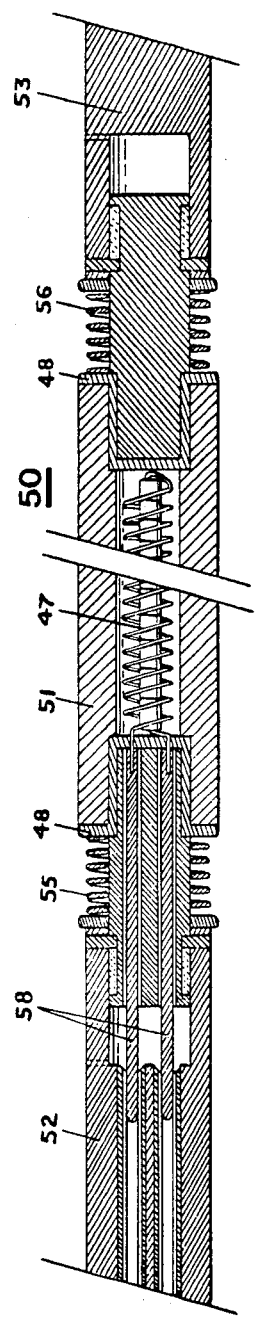

APPARATUS FOR MOULDING AN ARTICLE FROM PLASTIC MATERIAL

This application is a division of application Ser. No. 196,374, filed Oct. 14, 1980, now U.S. Pat. No. 4,409,176.

FIELD OF THE INVENTION

This invention relates to apparatus for moulding an article of plastic material from a parison of arbitrary form and where said parison is re-formed into the finished article by means of a difference in pressure applied to the wall of the parison and where in the re-forming of the parison an initial number of areas of the material are acted upon by elements which move these initial areas of the material in the parison, thereby creating the possibility for these other areas of the material to be re-formed when the article is moulded.

BACKGROUND

When moulding articles from parisons of plastic material, certain applications may present problems in achieving the desired re-forming of the parison where the extent of the re-forming is small in comparison with the wall thickness of the parison. It may be necessary to apply very great differences in pressure to the wall of the parison, particularly in the case of parisons made from plastic material which has already been oriented. Without in any way restricting the framing of the problem, an example may be given of the requirement to produce annular protruberances in a tube-shaped parison where after the parison has finally been re-formed into the desired article the annular protruberances constitute a "neck support" ring or a "pilfer proof" ring in a bottle.

In other applications where the extent of the re-forming is great by comparison with the wall thickness and particularly in the case of plastic material which has not been oriented, existing methods enable re-forming to take place with the use of relatively small differences in pressure. When the re-forming involves extensive stretching of the material, then the wall thickness may occasionally be reduced to such an extent that the strength or the dimensional stability of the moulded article is put at risk. The only solution to this problem with existing methods has been by the use of base material of adequate thickness.

When moulding a bottle, the requirement exists to produce a neck incorporating a so-called "pilferproof" ring and/or a so-called "neck support" ring and where in certain applications the "neck support" ring is so shaped that it forms a so-called gripping ring at the same time.

One of the purposes of the gripping ring is to act as a support for the hand so that it is easier to hold the bottle firmly, for instance when it is being opened. In order to meet this requirement, the gripping ring has a diameter which is considerably greater than the diameter of the neck at the point of the neck at which the gripping ring is located. Additional cost is associated with the dimensions of the gripping ring because it increases the total amount of material required to mould the neck when existing methods are used. This is due to the over-dimensioning of the neck which is necessary in order to provide the gripping ring with adequate strength, for example when pressurized liquids such as carbonated drinks are being stored. As a rule, the gripping ring also has an undesirably large axial dimension due to the moulding problems indicated above.

One additional requirement for the rings described above is that they should exhibit dimensional stability even when heated to relatively high temperatures, for example so that filled containers may be stored at high temperatures and so that containers may be cleaned before re-use, etc. It is difficult to achieve this by existing methods without treating the material in such a way that its visual appearance changes in an undesirable manner, for example by becoming opaque, whilst the material in the remainder of the bottle remains clear and transparent.

One other disadvantage of existing methods is that in the case of coloured material those parts of the bottle where there is variation in the thickness of the material are either darker or lighter than the remainder of the bottle depending on whether there is accumulation or attenuation of the material.

SUMMARY OF THE INVENTION

An object of the present invention is to provide apparatus for moulding an article of plastic material from which the problems referred to above have been eliminated. The basis of the invention is the use of a parison of arbitrary form in which certain areas of the parison are re-formed whilst other areas of the parison retain their original form to a very great extent. When moulding the initial areas of the material the other areas of the material are moved towards the initial areas, which makes it possible to avoid all attenuation of the wall thickness, if necessary, during the final moulding process. The invention will also permit an increase in wall thickness to be achieved in those areas which are re-formed. Even where the material in the parison has been oriented, only relatively small forces will be required for re-forming to take place, since the re-forming process occurs without the material being stretched beyond the point to which it was stretched in conjunction with the orienting process. This invention makes it possible to re-form oriented material for which, on the assumption that re-forming were to be at all possible, existing methods would require the use of unreasonably high differences in pressure. Experiments have shown that the material will fracture easily at such high differences in pressure.

When this invention is used in the manufacture of a bottle the starting point is a tube-shaped parison in which the areas of the material in the parison which form the neck of the bottle are already oriented and have preferably been oriented uniaxially. In those applications in which a requirement exists for dimensional stability to be present in the finished article even at high temperatures, the internal stresses which were created during the orienting process may be relieved by heat treatment. By virtue of this invention those areas of the material which are located adjacent to the material which will become the ring which is about to be moulded are moved during the moulding of the respective ring towards that area of the material which makes up the ring after the moulding process is complete. Material is thus brought to the area where the ring is moulded, thereby determining the wall thickness of the ring. The ring is moulded without any significant stretching of the material, but by means of a process which resembles folding. This movement of the material means that the rings are moulded with the internal pressure of the parison at a relatively low level. Where moulding is possible by existing methods, on the other hand, this requires unreasonably high pressures to be used which can easily produce fractures in the material.

When articles are to be shaped into preforms for bottles, a tubular parison of preferred shape is used, whose central areas have been oriented uniaxially by stretching the tube in the direction of the axis of the tube. When the parison is re-formed, the central areas are moulded into two opposing necks in the preforms.

In a preferred embodiment of the invention, the re-forming of the parison occurs at a temperature in excess of the glass-transition temperature (TG). In the event of the parison being formed into an article which must then undergo further moulding there is an additional requirement for the moulding of the article to take place at a temperature in excess of the temperature at which the subsequent moulding of the article will take place.

This invention is particularly suitable for use with the plastic material polyethylene terephthalate or with similar materials. Of the polyesters and polyamides, the following materials may be regarded as being of interest in the application of this invention: polyhexamethylene adipamide; polycaprolactam; polyhexamethylene sebacamide; polyethylene 2,6- and 1,5-naphthalate; polytetramethylene 1,2-dioxybenzoate and the copolymers of ethylene terephthalate, ethylene isophthalate and other similar polymer plastics.

When using polyethylene terephthalate, the re-forming of the parison takes place with the material of the parison at a temperature within the range of approximately 70°–150° C., and preferably within the range of approximately 90°–125° C. This temperature is well in excess of the glass-transition temperature (TG). The material of the parison is oriented by having been stretched in the respective direction of the axis, preferably about three times. In certain applications, for example when tube-shaped parisons are used as the base material for the manufacture of preforms for bottles, the material is of course uniaxially-oriented.

The recommended values indicated above in respect of temperature and stretching when using polyethylene terephthalate shall be amended when using any of the other materials referred to above, depending on the characteristics of said material as regards the glass-transition temperature and the maximum crystallization temperature, etc.

In a device for moulding a tube-shaped article from a tube-shaped parison, the parison is surrounded by an outer mould in which a number of retaining elements are so positioned as to secure the parison outside the area of the parison which is re-formed when the article is moulded. These retaining elements may be moved relative to each other along the axis of the mould. Between the retaining elements the outer mould also has a number of elements which are in contact with an initial numbers of areas of the material in the parison. These elements may also be moved relative to each other along the axis of the mould and may also be moved relative to the retaining elements. Between the elements which are in contact with the initial areas of the material are depressions in the wall of the mould in which details of the article are moulded from a number of other areas of the material in the parison, for example annular protruberances corresponding to the aforementioned "neck support" rings or "pilfer proof" rings. When the article is being moulded, the elements are in such close contact with the initial areas of the material referred to above that, when the elements are moved relative to each other along the axis of the mould, the areas of the material are moved in the direction of those areas of the material from which the details of the article are moulded. The distance over which each respective area of the material is moved corresponds on the whole with the protuberance in the wall of the parison which is produced as the respective details are moulded.

In many applications the strength of the parison is sufficient for the moulding described above to take place without the use of mechanical restraints inside the tube. The excess pressure present inside the tube contributes to the stability of the tube. A certain reduction in the internal volume of the tube also occurs during moulding causing the internal pressure to increase, which in turn both increases the dimensional stability of the parison and contributes to the achievement of the internal pressure required for the re-forming of the parison.

Certain applications have used an internal mandrel which operates in conjunction with the other mould. The mandrel is fitted with spring-loaded elements for reducing the length of the mandrel in the direction of the axis. The reduction in the length of the mandrel corresponds with the reduction in the length of the outer mould when the article is moulded.

Between the elements in contact with the initial areas of the material are arranged spring-loaded elements in which the spring tension varies along the direction of the axis of the mould. In this way the spring-loaded elements will be compressed in turn in accordance with a pre-determined pattern so that the wall of the parison will be moved in the order in which the annular protuberances are moulded. The heating of the material in the parison is effected either before the parison is placed in the mould and/or by means of heating devices preferably located inside the mandrel. An insulating layer is to be found on the mandrel, said insulating layer delineating the one or more areas of the mandrel at which heating takes place. The mould is provided with cooling ducts. The cooling ducts and the insulating layer separate those areas of the parison where heating takes place from other areas of the parison.

BRIEF DESCRIPTION OF THE DRAWING

The invention is described in relation to the annexed drawing containing a number of figures, in which:

FIGS. 2a–c diagrammatically outline the function of a device in accordance with this invention;

FIGS. 5a–c show a detailed section through the mandrel shown in FIGS. 3 and 4;

DETAILED DESCRIPTION

Figure 1C:
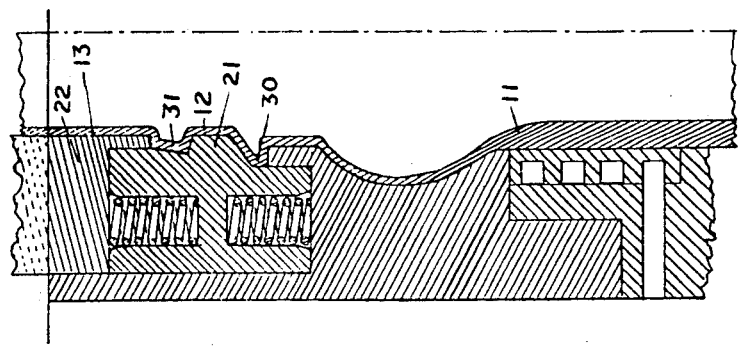
FIGS. 1a–c illustrate the basic sequence of events when moulding an article.
Figure 1B:
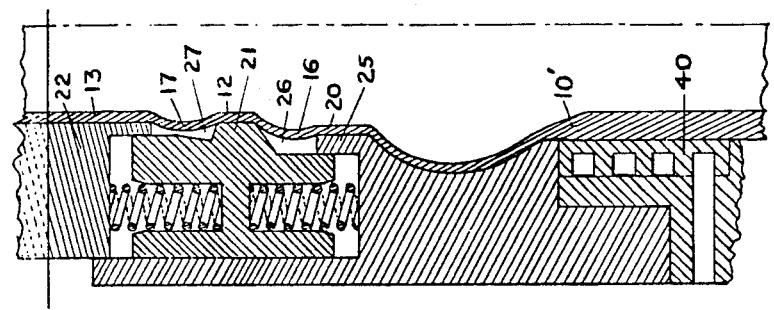
Figure 1A:
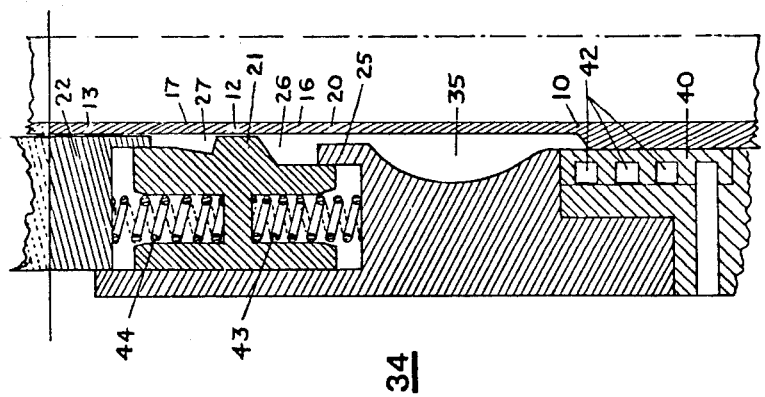

FIGS. 1a–c illustrate the principle according to which the re-forming of a parison 10 into an article 11 takes place. FIG. 1a shows the parison 10 which in FIG. 1b has been partly re-formed into the parison 10' and which in FIG. 1c has taken on its final shape and as such constitutes the article 11.

A mould 34 is to be found in the Figures which is particularly suitable for the re-forming of a tube-shaped parison 10. The mould comprises a number of component parts which may be moved relative to each other, and forming moulding elements 21, 22 and 25 which make contact with an initial number of areas of the material 12, 13 and 20 in the parison 10. There is also a number of depressions or recesses 26, 27 in the wall of the mould which face a number of other areas of the material 16, 17 in the parison 10. The element 21 is also supported by and movable relative to the elements 22, 25 so that the elements may be moved relative to each other in the direction of the axis of the tube-shaped parison. The elements are held apart from each other when at rest by means of spring-loaded elements 43, 44 so designed that the spring tension in the spring-loaded element 44 is greater than that in the spring-loaded element 43. A further depression 35 in the wall of the mould is also shown in the Figures. Finally, the Figures also show a retaining element 40 in which cooling ducts 42 are incorporated.

When re-forming the parison 10 into the article 11, the inside of the parison is put under pressure whereby the parison is dilated to a certain smaller extent (FIG. 1b) to ensure contact between the elements 21, 22 and 25 and the initial areas of the material 12, 13 and 20 and to ensure that the parison 10 is secured by the retaining element 40. The large depression 35 in the wall of the mould is of such proportions that the excess pressure inside the parison 10 is able to dilate the parison into contact with the wall of the mould in the depression 35. However the pressure is insufficient to move the two other areas of the material 16, 17 into contact with the wall of the mould in the depressions 26, 27.

The next stage in the re-forming of the parison 10′ involves the downward movement of the element 22 as shown in FIG. 1b, whereby the element 21 follows the movement of the element 22. Friction between the parison and the elements 21, 22 causes the areas of the material 12, 13 to be drawn along with the area of the material 17 as the element is moved downwards at the same time as the pressure inside the parison forces the area of the material 16 into contact with the wall of the mould in the depression 26, of which the axial length is reduced during the moulding process. An annular protuberance 30 is formed in the article 11 in this way (FIG. 1c). A further downward movement of the element 22 then takes place, as shown in the Figure, when the area of the material 13 follows the element in its downward movement and the internal pressure inside the parison 10′ forces the area of the material 17 into contact with the wall of the mould in the depression 27, of which the axial length is reduced simultaneously in a similar fashion to that which has already been described for the depression 26. An annular protuberance 31 formed in the depression 27 in this way (FIG. 1c). The movement of the initial areas of the material 12, 13 means that the annular protuberances 30, 31 may be moulded without stretching the material and without the reduction in wall thickness associated with stretching.

The principle in accordance with which a parison is re-formed into an article by virtue of this invention has been described above in relation to a tube-shaped parison. The idea of the invention as such is, of course, applicable to parisons of other shapes. In the case of a flat parison, for example, the elements 40, 25, 21, 22 are supplemented by means of restraints arranged on the opposite side to the flat parison. The moulding elements, for example machanical ones, move areas of the material into the depressions 35, 26, 27 as the parison is being re-formed and into contact with the wall of the mould in the respective depression. Thus in this latter embodiment of the invention, too, the movements of the initial areas of the material 12 and 13 enable protuberances to be formed which correspond with the annular protuberances 30, 31. When re-forming the parison to obtain contact with the wall of the mould in the large depression 35 re-forming only occurs by stretching the material, which results in a reduction in the wall thickness. Of course the idea of the invention also includes the possibility of taking advantage of the movement of the material even in this latter re-forming process in order to reduce the attenuation of the material which would otherwise occur.

In FIGS. 2a–c, which represent in outline the function of a device in accordance with this invention for moulding a tube-shaped parison, an upper half of the mould 65 may be moved to an open position (FIG. 2a) by means of brackets 74, 75. The surfaces of the upper half of the mould which make contact with those of the lower half of the mould (not shown in the Figures) are hatched for the sake of clarity. It may be seen from the Figures (cf. in particular FIG. 2a) that the article formed in the device consists of two opposing necks in preforms for use in the manufacture of bottles. Reference numerals are shown for certain of the elements which have already been described in connection with FIGS. 1a–c. The designations a and b are used in respect of the symmetrically arranged elements so as to indicate the symmetry of the device. The Figures also show the retaining element 40a to be attached to the carriage component 73 with no possibility of being moved in an axial sense relative to the carriage component. Although this arrangement simplifies the construction of the device, the invention offers the possibility of using other combinations of stationary and moving elements in order to achieve the required relative movements between the elements.

In addition to the elements already described, FIGS. 2a–c show a supporting framework 60 with a sliding bearing. The framework supports a carriage component 73 in which the lower half of the mould rests. A mandrel 50, which is shown in its extended position in FIG. 2a, has a central section 51 with end sections 52, 53. The central section and the end sections are separated by spring-loaded elements 55, 56. A hydraulic union 57 is also provided for connection to the drive unit of the carriage component, as wel as a hydraulic union 67 for connection to the drive unit of the mandrel and a compressed fluid union 61 for setting the internal pressure of the parison. The reference number 59 designates the electrical connection for the heating device inside the mandrel. The interconnected components of the mould in the upper half of the mould are held together by the linking elements 62, 63.

In the position shown in FIG. 2a, a tube-shaped parison is placed in the lower half of the mould and the upper half of the mould is moved to its closed position by a drive unit. From their positions of greatest disengagement, which are necessary in order to permit the upper half of the mould to move past the end surfaces of the tube in conjunction with the movement of the upper half of the mould to its closed position, the retaining elements 40a, b are moved toward each other over the distance 2E so as to seal the mould against the end surfaces of the tube. The mandrel is then moved by means of its drive unit into a position inside the parison and the inside of the parison is put under pressure. At the point in time at which the pressure is set, the material in the parison is at a temperature in excess of the glass-transition temperature (TG). Heating takes place either before the parison is brought to the mould or after the parison has been placed in the mould. Alternatively, heating of the parison before it is placed in the mould may be combined with a certain amount of post-heating inside the mould.

As pressure is applied, the parison takes on a shape which corresponds with the parison 10' in FIG. 1b. The components of the mould are then moved so that the shapes which correspond with the protuberance 30 in FIG. 1c are produced, followed finally by the shapes corresponding with the protuberance 31 in FIG. 1c. The letter F is used in the Figures to indicate the movement required in order to produce the shapes corresponding with the two protuberances 30 and 31. Since two opposing preforms are produced simultaneously, the length of the mould is reduced by the distance 2E+2F in conjunction with the moulding of the article.

Figure 3:
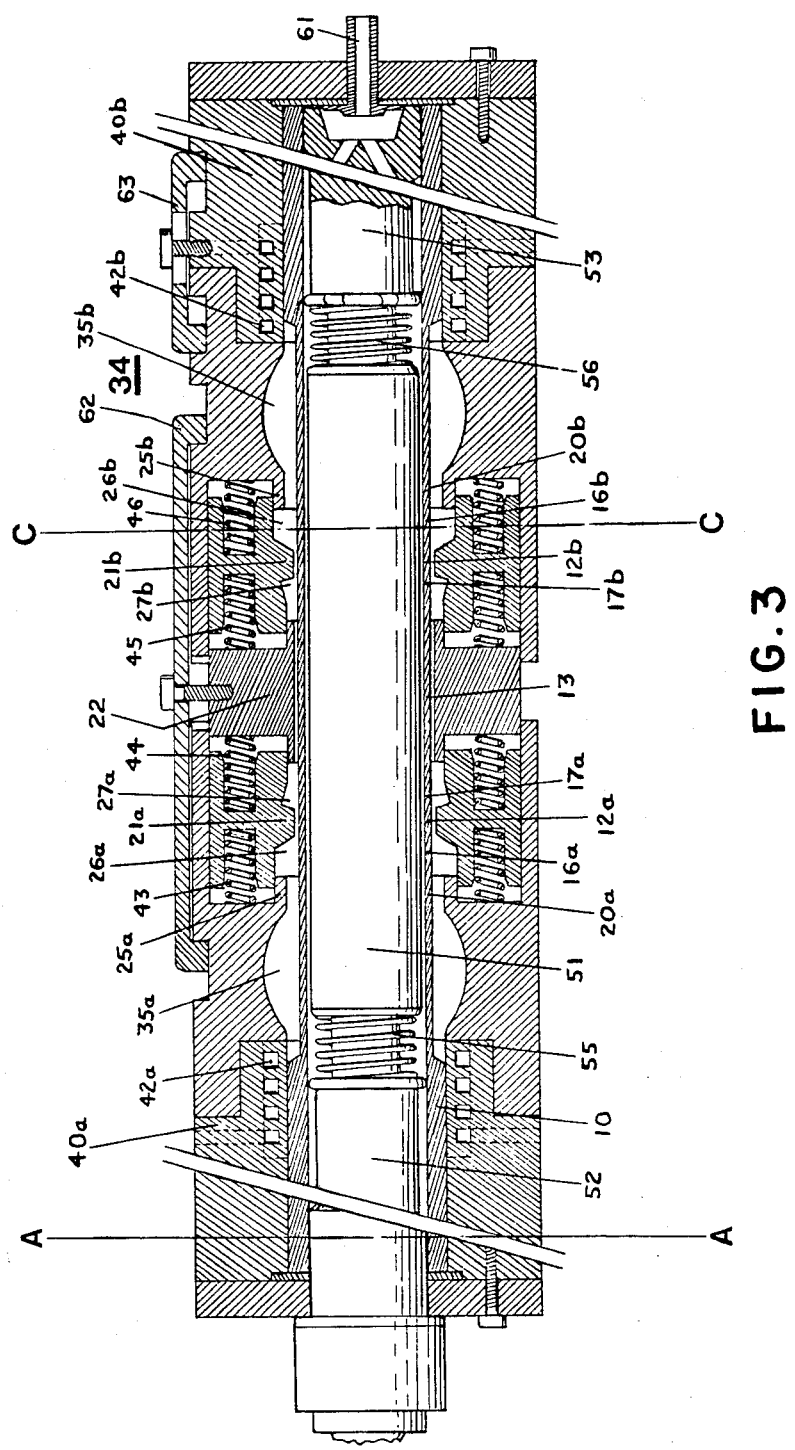
FIGS. 3 and 4 show, in section, a device operating in accordance with the function outlined in FIG. 2 with the device in various operating positions and where the Figures correspond with Section B—B in FIG. 6.
Figure 4:
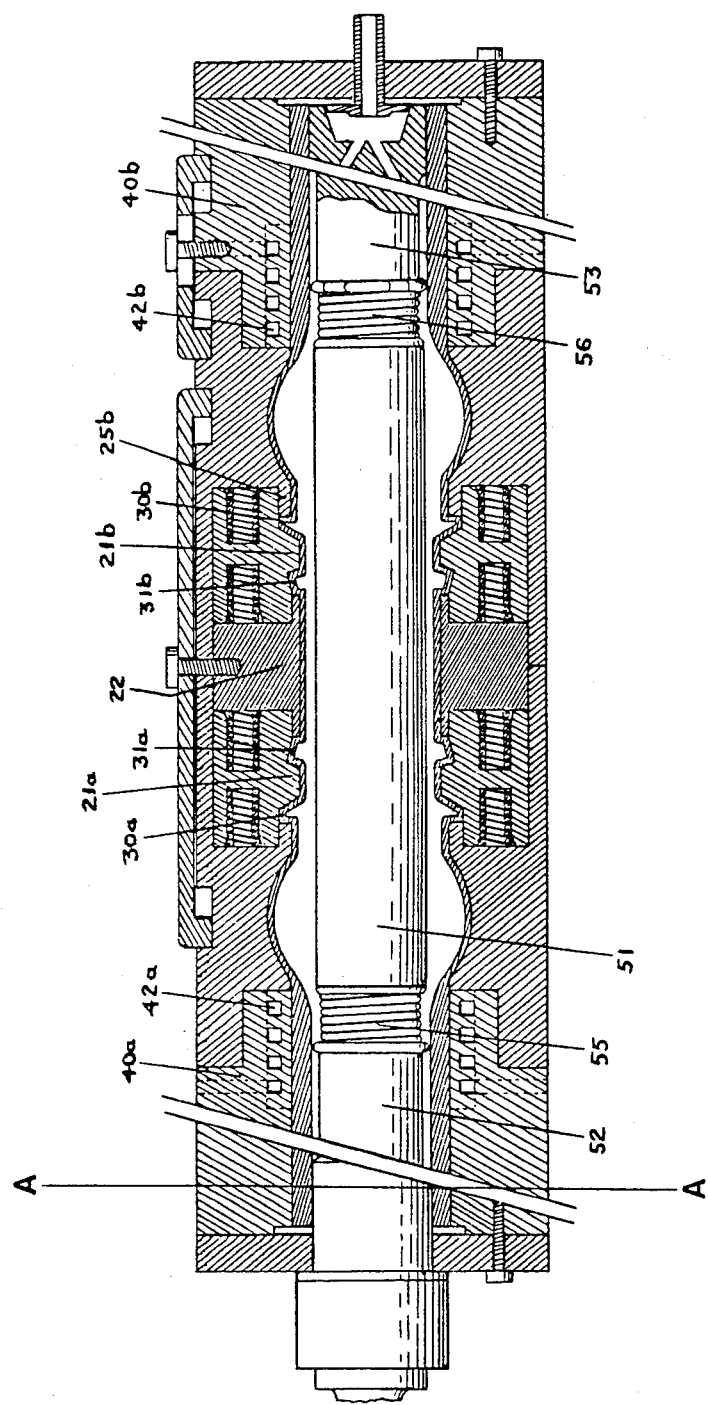

FIGS. 3 and 4 show a longitudinal section through a device for moulding two opposing preforms suitable for subsequent re-forming into bottles in which the reference characters in respect of the parison 10 and the mould 34 correspond with those used previously when describing FIGS. 1 and 2. FIG. 3 corresponds with FIG. 1a and FIG. 4 corresponds with FIGS. 1c and 2c.

The FIGS. 5a–c show, in detail, the construction of the mandrel 50. The reference characters used in respect of the mandrel 50 correspond with the reference characters previously used in the descriptions of FIGS. 2–4. In addition, reference numeral 47 is used to indicate a heating device arranged in the central section 51 of the mandrel. The heating device is shown in the Figure as an electric heating device which is joined to the electrical connection 59 (FIG. 2b) by means of sliding contacts 58.

The central section 51 of the mandrel is delineated by the insulating layer 48 which prevents heat from the central section of the mandrel from being transmitted to the end sections 52, 53 of the mandrel and thus to the parison in areas where no re-forming of the parison is to take place.

Figure 6:
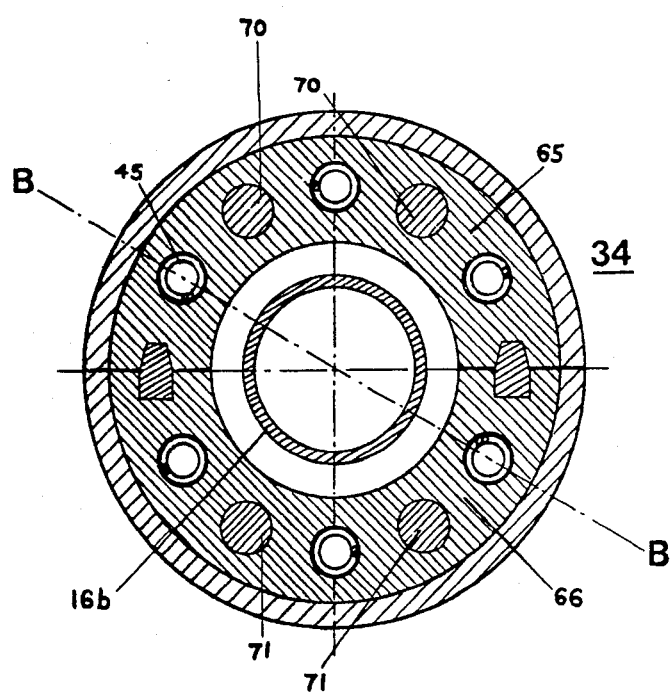
FIG. 6 is a sectional view taken along Section C—C in FIG. 3.
Figure 7:
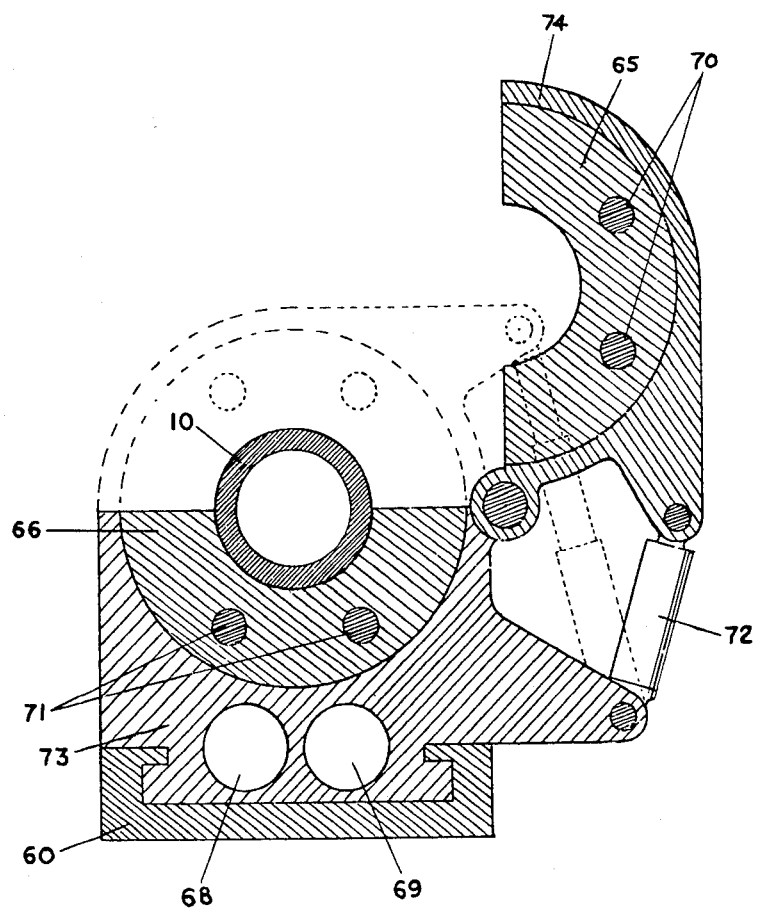
FIG. 7 corresponds to Section A-A in FIGS. 3 and 4, also with the supporting framework for the device in accordance with FIGS. 3 and 4.

FIG. 6 shows the Section C—C in FIG. 3, and FIG. 7 shows the Section A—A in FIGS. 3 and 4. FIG. 6 also incorporates the Section B—B which corresponds with the longitudinal section shown in FIG. 3. FIG. 6 also shows the division of the mould into an upper half of the mould 65 and a lower half of the mould 66 already referred to above. The reference numerals 70, 71 are used to indicate sliding bearings for the component parts of the mould in the upper half of the mould and in the lower half of the mould respectively. Also shown is the area of the material 16b in the parison which has not yet been put under pressure. FIG. 7 illustrates the manner in which a carriage component 73 in which the mould rests is supported in the framework 60. In the carriage component is a hydraulic cylinder 68 which drives the mandrel together with another hydraulic cylinder 69. The latter hydraulic cylinder is the drive unit which moves the component parts of the mould in the direction of the axis of the mould. An additional drive unit 72 is to be found which links the carriage component 73 to the bracket 74 for the purpose of moving the upper half of the mould between the open and closed position of the mould 34. A similar drive unit is connected to the other end of the mould.

The principle of the invention has been described in relation to FIGS. 1a–c, whereas the function of a device in accordance with the invention has been described in relation to FIGS. 2a–c. The detailed FIGS. 3–7 represent only a clarification of FIGS. 2a–b. Thus the description of the function given in relation to FIG. 2 is also applicable to the following FIGS. 3–7, for which reason no new description of the function is provided.

The concept of the invention will, of course, accommodate a good many devices which operate in accordance with it. The device which is described in detail shall therefore only be regarded as a typical device in accordance with the invention.

What is claimed is:

1. Apparatus for molding an article from a tube-shaped parison of thermoplastic material having an oriented portion which is of relatively high strength and resistant to stretching, said apparatus comprising mold means including a wall with a cylindrical mold surface provided with a plurality of axially spaced recesses therein, means for applying internal pressure to the parison to bring a plurality of regions of the oriented portion of the parison into contact with said cylindrical mold surface in axially spaced regions of the mold means adjoining said recesses such that the parison extends across the recesses without entering into contact with the mold wall at said recesses, means for relatively displacing said axially spaced regions of said mold means in axial direction to axially shift the plurality of axially spaced regions of the parison while concurrently applying the internal pressure to said parison and reducing the axial extent of said recesses to a final position in which said recesses are of ring-shape with a defined cross-sectional profile, the relative axial displacement of said regions of said mold means in combination with the reduction of the axial extent of the recesses and the internal pressure applied to the parison causing said regions of the parisons in contact with the mold wall under the application of internal pressure to be correspondingly relatively axially displaced with said regions of the mold means while the portions of the oriented portions of the parison extending across said recesses are shaped into said recesses under said internal pressure, and means for halting the relative displacement of said axially spaced regions of the mold means substantially when said portions of the parison have entered said recesses and assumed the shape of said recesses in said final position without substantial stretching and change in wall thickness of said portions of said parison to form a hollow ring-shaped profile on said article.

2. Apparatus as claimed in claim 1 comprising a mandrel within said parison and including means for shortening the axial length of said mandrel in correspondence with the reduction of axial extent of said regions of said mold means.

3. Apparatus as claimed in claim 2 wherein said means for shortening the axial length of said mandrel comprises a plurality of mandrel elements for said mandrel and spring means between said mandrel elements.

4. Apparatus as claimed in claim 2 wherein said mold means comprises a plurality of spring loaded mold elements defining said recesses.

5. Apparatus as claimed in claim 4 comprising spring elements between respective mold elements acting to urge said mold elements to extended positions in which said recesses are of maximum axial extent.

6. Apparatus as claimed in claim 5 wherein said spring elements have differing spring tension such that said mold elements are moved successively towards one another when forming said ring-shaped profile on said article.

7. Apparatus as claimed in claim 4 wherein said mandrel includes a central portion including heating means for heating the material of the parison.

8. Apparatus as claimed in claim 7 further comprising heat insulating means on said mandrel for blocking heat transfer from said central portion to the remainder of the mandrel.

9. Apparatus as claimed in claim 7 wherein said mold means further comprises first and second retaining means for respectively clampingly holding the parison at end portions thereof outside the portions which form said ring-shaped profile on said article, said first and second retaining means being coupled together through said spring-loaded elements and undergoing relative displacement towards one another when said spring-loaded elements are axially displaced to reduce the axial extent of said recesses.

10. Apparatus as claimed in claim 9 comprising cooling duct means in said first and second retaining means for cooling said parison in the transition region between the portion heated by the heating means and said end portions of the parison.

11. Apparatus as claimed in claim 1 wherein said mold means comprises a plurality of spring loaded mold elements defining said recesses.

12. Apparatus as claimed in claim 11 wherein said plurality of mold elements comprises first and second elements with spring means therebetween to permit relative displacement between said elements, one of said elements forming two of said recesses with the other of said elements.

13. Apparatus as claimed in claim 11 wherein said mold elements include first and second opposed mold elements which are slidably arranged relative to one another with a space therebetween, and a third mold element interposed between the first and second mold elements in said space therebetween for defining respective recesses therewith.

14. Apparatus as claimed in claim 13 wherein said means for halting the relative displacement of said axially spaced regions of the mold means comprises stop surfaces on said first, second and third elements which come into contact with one another when the first and second elements are relatively displaced to the positions in which the recesses are in their final positions.

15. Apparatus as claimed in claim 14 comprising spring means respectively between said first and third elements and between said second and third elements.

* * * * *